US006603871B2

(12) United States Patent
Liang

(10) Patent No.: US 6,603,871 B2
(45) Date of Patent: *Aug. 5, 2003

(54) FIRST-ORDER AUTHENTICATION SYSTEM

(75) Inventor: Louis H. Liang, Los Altos, CA (US)

(73) Assignee: Angstrom Technologies, Inc., Erlanger, KY (US)

( * ) Notice: Subject to any disclaimer, the term of this patent is extended or adjusted under 35 U.S.C. 154(b) by 178 days.

This patent is subject to a terminal disclaimer.

(21) Appl. No.: 09/819,529

(22) Filed: Mar. 28, 2001

(65) Prior Publication Data
US 2001/0054644 A1 Dec. 27, 2001

Related U.S. Application Data

(63) Continuation-in-part of application No. PCT/US99/22409, filed on Sep. 27, 1999.
(60) Provisional application No. 60/102,147, filed on Sep. 29, 1998.

(51) Int. Cl.[7] ................................................. G06K 9/00
(52) U.S. Cl. .......................................... 382/135; 356/71
(58) Field of Search ................................ 382/100, 112, 382/135; 340/5.1, 5.8, 5.86; 250/559.39; 356/71

(56) References Cited

U.S. PATENT DOCUMENTS

| 3,573,472 | A | 4/1971 | Madalo ........................ 250/219 |
| 3,783,290 | A | 1/1974 | Fujii et al. ................... 250/456 |
| 4,131,879 | A | 12/1978 | Ehrat ..................... 340/146.3 H |
| 4,146,792 | A | 3/1979 | Stenzel et al. .............. 250/365 |
| 4,277,774 | A | 7/1981 | Fujii et al. ............ 340/146.3 Q |
| 4,558,224 | A | 12/1985 | Gober ....................... 250/461.1 |
| 4,598,205 | A | 7/1986 | Kaule et al. .............. 250/458.1 |
| 5,041,954 | A | 8/1991 | Forrest, Jr. ................... 362/234 |
| 5,089,709 | A | 2/1992 | Chadwick ................ 250/461.1 |
| 5,262,650 | A | 11/1993 | Chadwick ................ 250/461.1 |
| 5,456,498 | A | 10/1995 | Greene ......................... 283/70 |
| 5,512,758 | A | 4/1996 | Kobayashi et al. ....... 250/461.1 |
| 5,592,561 | A | 1/1997 | Moore ......................... 382/103 |
| 5,673,338 | A | 9/1997 | Denenberg et al. ......... 382/209 |
| 5,719,939 | A | 2/1998 | Tel ............................... 380/23 |
| 5,719,948 | A | 2/1998 | Liang ......................... 382/112 |
| 6,470,093 | B2 * | 10/2002 | Liang ......................... 382/135 |

FOREIGN PATENT DOCUMENTS

WO      WO 97/06502 A1      2/1997      ............ G06K/5/00

OTHER PUBLICATIONS

R. Winn Harden, "Sophisticated software helps machine vision check bank notes" *Vision Systems Design* (Nov. 1998) pp. 25–32.

* cited by examiner

Primary Examiner—Andrew W. Johns
(74) Attorney, Agent, or Firm—Theodore R. Touw

(57) ABSTRACT

A system (10) is provided for performing first order authentication of articles marked with indicia (30) discernible in visible, ultraviolet, or infrared light or tagged with UV- or IR-sensitive chemicals. The first-order authentication system provides reliable visual authentication by providing for juxtaposition of the article-under-test (20) with a known reference-standard sample-specimen (90, 100, or 300), while the article-under-test (20) is illuminated by a suitable source (65 or 250) of radiation in the visible, ultraviolet, or infrared portions of the electromagnetic spectrum. Thus, the system (10) facilitates comparison to differentiate a genuine article from a counterfeit article with first-order accuracy but at a substantially lower cost than that of automated authentication systems. Additionally, the system can be used in both portable and desk top embodiments. The system preferably has optional interchangeable holders (140 or 400) for various articles-under-test as well as an optional interchangeable holder (115) for various reference-standard sample-specimens. Some embodiments utilize structures incorporating split-image optics (200), superposed-image optics, and/or a blink-comparator.

23 Claims, 9 Drawing Sheets

FIRST-ORDER AUTHENTICATION SYSTEM

CROSS REFERENCE TO RELATED APPLICATIONS

This application is a continuation-in-part of international application number PCT/US99/22409, filed Sep. 27, 1999, now published as WO 00/19357, which claimed the benefit of Provisional Patent Application Ser. No. 60/102,147 filed in the United States Patent and Trademark Office on Sep. 29, 1998.

TECHNICAL FIELD

This invention relates to a system that facilitates authentication of genuine articles and discrimination of genuine articles from counterfeit articles. This invention relates more particularly to first order authentication, detection, discrimination, and recognition of indicia or taggants that become visible when they are excited by sources of invisible radiation, such as ultraviolet (UV) or infrared (IR) light sources. Specifically, the authentication is accomplished by human judgment through visual means by comparing an article with an applicable reference-standard sample-specimen provided with the apparatus and disposed to facilitate comparison.

BACKGROUND ART

The counterfeiting of articles of many kinds has become a serious problem worldwide causing great loss of revenues to legitimate business, individuals, and governments. One of the methods to protect the articles from counterfeiting is incorporation of special markings that are difficult to reproduce but that enable easy detection. Examples are articles that are tagged or marked with identification marks that are printed using normally invisible chemicals, such as UV- or IR-sensitive chemicals. (Throughout this description, the term "taggants" refers to materials or visible or invisible indicia included in or on an article to mark it for authentication. In order to avoid confusion with "pure" ultraviolet light sources that emit only ultraviolet light, those commonly available light sources that emit ultraviolet light and also emit some visible light will be referred to as "black light" sources.) Counterfeiting, moreover, has produced articles with similar hidden identification marks that are so sophisticated that only high performance scanners and laboratory equipment can distinguish the counterfeit article from the genuine article. At the same time, counterfeiters using primitive methods, apparatus, and processes have produced some less valuable articles, such as food stamps, coupons, toys, etc. that will require first order authentication in the field. Since the articles in question do not command high value, it is often not practical to employ sophisticated apparatus in the first order authentication process. Instead, low-cost and reasonably reliable apparatus is preferred.

Many devices have been developed which can automatically determine authenticity of articles by detecting markings made with substances that are not normally visible in ordinary light, but become detectable by the devices when illuminated with non-visible radiation. U.S. Pat. No. 3,573,472 to Madalo discloses a label verification system in which each label to be verified is imaged onto a matrix of photocells, and an authentic label is imaged onto another matrix of photocells. Symbols on the labels preferably contain photoluminescent substances, and the matrix of photocells is provided with suitable filters, so that when the labels are illuminated with ultraviolet light, photocell responses are at a much higher degree of contrast. U.S. Pat. No. 4,146,792 to Stenzel et al. discloses paper secured against forgery and a device for checking the authenticity of such papers. The paper carries materials that fluoresce in the visible, ultraviolet, or infrared spectral range in characteristic emission spectra. The device includes a light source for exciting fluorescent substances, a condenser lens concentrating the light emitted by the paper, a narrow band interference filter, a focusing lens, and a series of photocells arranged in the focal plane of the focusing lens. The outputs of the photocells are fed to a preamplifier and then to a comparator, and outputs of photocells are compared to establish the authenticity of the paper. U.S. Pat. No. 4,277,774 to Fujii et al. discloses a currency discriminating apparatus that utilizes the presence of a light-emitting substance in a printed zone of the currency when irradiated with ultraviolet rays. The apparatus comprises an ultraviolet ray-emitting member, a photoelectric converter element, and a discriminating circuit for checking pattern signals. U.S. Pat. No. 4,558,224 to Gober discloses a counterfeit paper currency bill warning device that utilizes the characteristic fluorescence of genuine paper currency. In Gober's device, an ultraviolet lamp illuminates the paper currency of unknown origin, and a sensor circuit responds to fluorescent radiation from the currency to give a signal to an indicator which displays an indication of the fluorescence of the unknown paper currency relative to the fluorescence of genuine paper currency. The sensor is a photoresistor and the indicator is a variable intensity light or a digital display.

U.S. Pat. Nos. 4,451,521 and 4,598,205 to Kaule et al. disclose security paper with authenticity features in the form of substances luminescing only in the invisible region of the optical spectrum. A corresponding test apparatus makes it possible to check the authenticity of the security paper in the presence of customers but unnoticed by them. The invisibility of the test signal and the authenticity signal are taken advantage of, and the test device is hidden behind a plate non-transmissive for visible light, which however is transmissive for the test signal and for the authenticity signal. U.S. Pat. No. 4,833,311 to Jalon discloses a security marking procedure, an apparatus to sense a security marking, and fiduciary documents provided with security markings utilizing rare-earth chelates consisting of at least two rare earths. The fluorescent wavelengths of the rare-earth chelates vary as functions of temperature.

U.S. Pat. No. 4,889,367 to Miller discloses a multi-readable information system which includes information in a machine-readable bar code and a different type of information that occupies the same field area of the substrate material, such as information in human-readable symbology that is printed in at least a portion of the area occupied by the bar code. The bar code is printed in a first ink that can be read utilizing energy of a first wavelength and the human-readable symbols are printed in a second ink that can be read under illumination by a humanly visible wavelength. U.S. Pat. No. 5,414,258 to Liang discloses apparatus and methods for calibration of fluorescence detectors; the apparatus incorporates standard target elements comprising predetermined fluorescent substances with known emission spectra and either non-fluorescent substances or fluorescent substances with other known emission spectra.

Automated authentication systems for articles tagged with UV sensitive chemicals are well established, for example, the Angstrom Technologies Omni series UV scanners and systems. Similar systems are described in U.S. Pat. No. 4,642,526 to Hopkins, in U.S. Pat. Nos. 5,418,855, 5,548,106, 5,574,790 and 5,666,417 to Liang et al., and in U.S. Pat. No. 5,719,948 to Liang. These authentication systems prove to be accurate and fast in authentication without needing any human subjective judgment. They are commonly employed to differentiate valuable genuine articles from the counterfeit articles. However, they are also relatively expensive and sometimes cannot be justified for applications where the value of the articles in question is very low. Furthermore, in situations where not all articles have been tagged with the specialty chemicals, such as older passports, bank notes, and some credit cards, a fully automated system could give false readings if the articles are scanned automatically without human intervention. Similarly, a universal automated scanner for all credit cards or bank notes will be a challenging task because various credit cards and bank notes have different markings, with different taggants, and at different locations on the cards or notes.

PCT International Publication WO 97/06502 "Optical Image Authenticator" by Atherton et al. describes an authentication system in which a light intensity pixel array is detected and compared with a reference pixel array to determine if each pixel is either good or bad. Authentication is done on the basis of the number of good/bad pixels or their ratio.

Several of the approaches in the prior art have addressed only individual currency standards in existence at the time of their invention, such as general broad-band fluorescence from paper stock, commonly known as background fluorescence, emitted by brightener or other substance used in the paper-making process. Any broad-band fluorescent ink can possibly trigger a detector of these types; for example, a mark that has fluorescent characteristics positioned anywhere on the currency or a simple stamp mark with fluorescent property. Therefore, such methods are not completely reliable.

The prior art generally does not describe solutions to the problem of how to authenticate the recently printed United States of America currency in which each denomination ($20, $50, $100 and the planned future $10 and $5 bills) has its own unique fluorescent "security thread." Currencies of other nations, such as France and Switzerland, also have unique fluorescent features for each denomination of currency. Furthermore, the prior art does not address the method of authenticating other security features in the currency or in other articles that have security features other than fluorescent features.

Typically, desirable modern security features contain both visible and invisible means for enhanced counterfeit protection. The U.S. currency mentioned above has several security features visible under ordinary light characterized by wavelengths in the visible portion of the spectrum, in addition to its fluorescent features. For example, it has fine-line printing patterns in selected areas, a watermark, color-shifting ink in selected indicia, microprinting, Federal Reserve System indicia, etc. Many other currencies, such as those of Austria, Egypt, France, Germany, Italy, the Netherlands, and Switzerland, also have combinations of invisible and visible features, such as fluorescent paper, stripes, numerals, or threads, and a watermark visible in ordinary visible light. Therefore, it is desirable, under some situations, to have an authentication system that is more flexible and versatile even if it requires human judgment and even if it is less accurate and capable than an automatic system.

In many applications, it is desirable to have fast authentication capability of an article with visual means because the articles are not uniformly tagged for automated scanning such as U.S. currency $100, $50, or $20 bills, or credit cards, such as Visa, Master Charge, or American Express credit cards.

The commonly available black lights with some UV output and IR viewing scopes are simple to operate, have great flexibility and are of relatively low cost. Authentication of articles in question using only such apparatus is, however, completely dependent on subjective human judgment. Since counterfeiters can often imitate the taggant with a roughly similar chemical and printing, including printings by hand and rubber stamp, it will challenge a human examiner's ability to distinguish counterfeit articles from the genuine articles. The relatively unreliable earlier authentication methods merely using black lights or IR viewing scopes alone have very limited practical value. It is therefore desirable to have an improved apparatus and methods suitable for first-order visual authentication.

DISCLOSURE OF INVENTION

An overall object of the invention is an authentication system that is low in cost and versatile but reliable to the first order. Portability, ease of operation, interchangeability of holders of the article to be authenticated (henceforth "article-under-test"), and provisions for a reference-standard sample-specimen are other objects of this invention.

A system is provided for performing first order authentication of articles marked with indicia discernible in visible, ultraviolet, or infrared light or tagged with UV- or IR-sensitive chemicals. The first-order authentication system provides reliable visual authentication by providing for juxtaposition of the article-under-test with a known reference-standard sample-specimen, while the article-under-test is illuminated by a suitable source of radiation in the visible, ultraviolet, or infrared portions of the electromagnetic spectrum. Thus, the system facilitates comparison to differentiate a genuine article from a counterfeit article with first-order accuracy but at a substantially lower cost than that of automated authentication systems. Additionally, the system can be used in both portable and desk top embodiments. The system preferably has optional interchangeable holders for various articles-under-test as well as an optional interchangeable holder for various reference-standard sample-specimens. Some embodiments utilize structures incorporating split-image optics, superposed-image optics, and/or a blink-comparator.

COPYRIGHTED MATERIALS

A portion of the disclosure of this patent document contains material that is subject to copyright protection. The copyright owner has no objection to publication by the U.S. Patent and Trademark Office under 35 USC §122(b) or to facsimile reproduction of the patent disclosure as it appears in the U.S. Patent and Trademark Office files or records, but the copyright owner otherwise reserves all copyright rights whatsoever.

MODES FOR CARRYING OUT THE INVENTION

The invention will be made clear by the following more detailed description, read in conjunction with the drawings.

Figure 1:
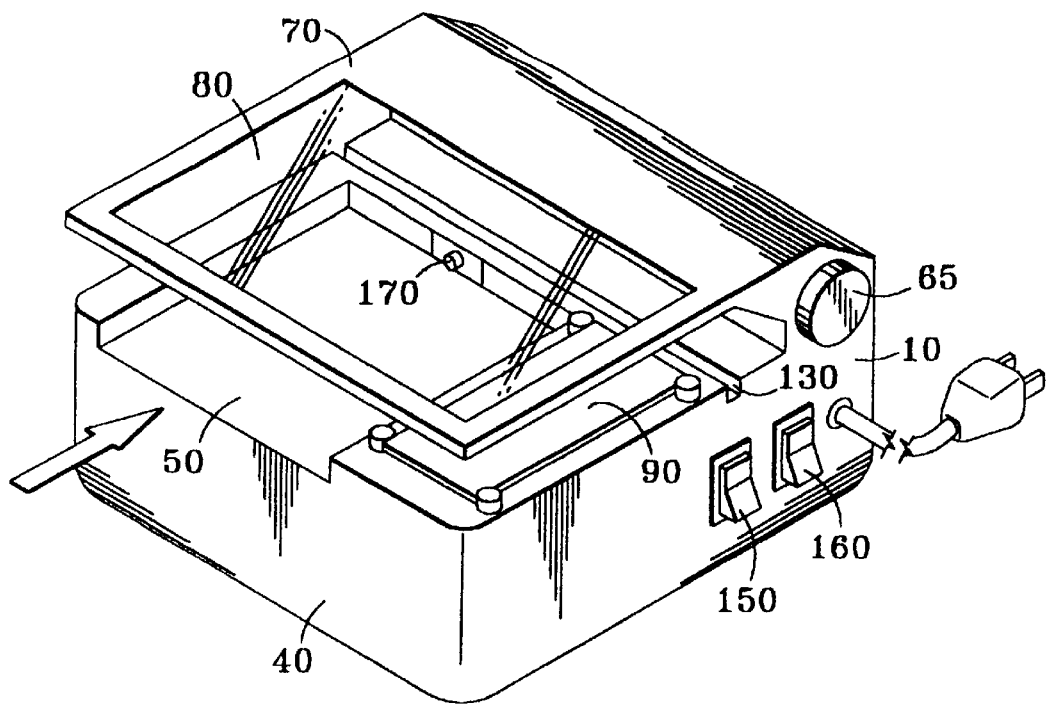
FIG. 1 shows a perspective view of a preferred embodiment of an authentication apparatus made in accordance with the invention.
Figure 2A:
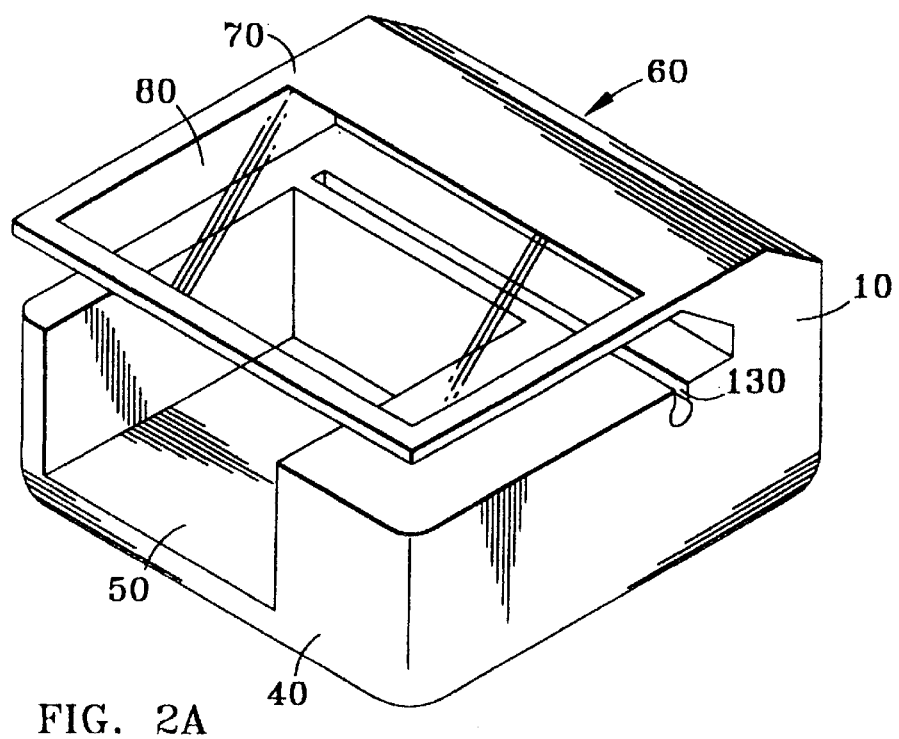
FIGS. 2A–2D show perspective views of parts of an alternative embodiment of authentication apparatus made in accordance with the invention.
Figure 2B:
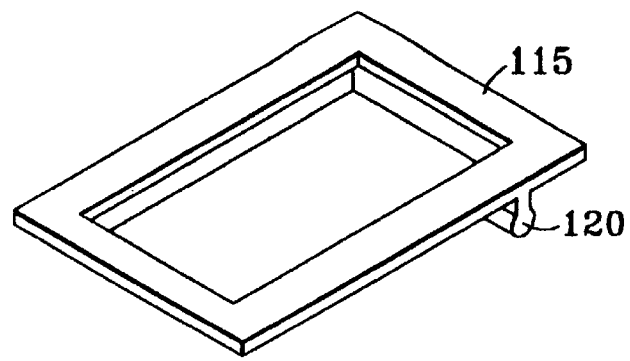
Figure 2C:
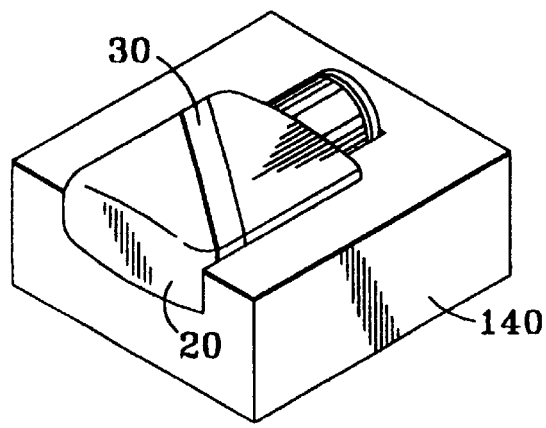
Figure 2D:
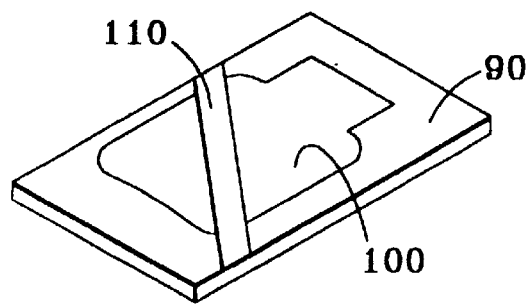
Figure 5:
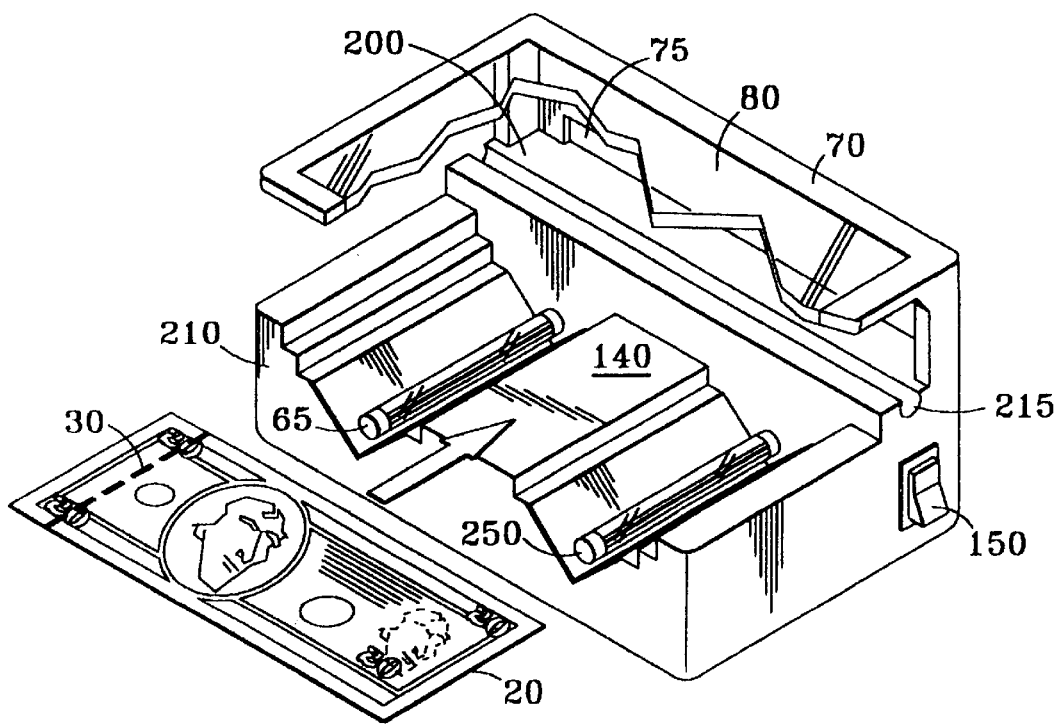
FIG. 5 shows a perspective view, partially cutaway, of a fifth embodiment of an authentication apparatus.

FIG. 1 shows a perspective view of an authentication apparatus made in accordance with the invention. FIGS. 2A–2D show perspective views of parts of an alternative embodiment. As shown in FIG. 1, an authentication system 10 according to this invention consists of a housing 60 containing an excitation source 65, such as a white-light lamp (visible spectrum range), UV lamp, black light, or IR lamp, a receptor portion 50 for the article-under-test 20, and a holder 115, preferably a movable one, for the reference-standard sample-specimen 90 that is used as a reference standard during the authentication process. Reference-standard sample-specimen 90 preferably includes one or more visible examples of genuine authentication features. The arrows in FIGS. 1 and 3 indicate schematically the direction of inserting an article-under-test 20. Article-under-test 20 is not shown in FIG. 1, but examples are shown in FIGS. 2C and 5. Excitation source 65 may be contained within housing 60 as shown, or may be attached to the housing. Receptor portion 50 may be an integral part of housing 60 as shown, or may be removable from the housing and may be made interchangeable. Reference-standard sample-specimen holder 115 may be stationary or movable.

Thus, article-under-test 20 is preferably marked with indicia 30 visible under illumination with radiation in a predetermined spectral range, which may be entirely in the visible range of the spectrum, partly or wholly in the ultraviolet spectral range, or partly or wholly in the infrared spectral range.

Article-under-test 20 is preferably held in a holder 140 that fits into receptor portion 50. Authentication system 10 preferably has a cover portion 70 with a viewing window 80.

Viewing window 80 preferably passes visible light but blocks the invisible UV or IR radiation from excitation source 65. Throughout this description and the appended claims, the terms "invisible radiation" or "non-visible radiation" are used to mean radiation characterized by one or more wavelengths in a portion of the electromagnetic spectrum outside the visible spectral range, such as the ultraviolet or infrared portions of the electromagnetic spectrum.

A user who wishes to examine an article-under-test 20 for authenticity disposes article-under-test 20 in suitable relation to viewing window 80. When the excitation source 65 is turned on, the article-under-test is illuminated by the visible-, UV-, or IR-light source 65, and a taggant, visible indicia, or fluorescent image indicia 30 become visible. The reference-standard sample-specimen 90 is juxtaposed with the article-under-test 20 by being disposed near the article-under-test 20 or superimposed upon the article-under-test 20 or upon a portion of the article-under-test 20. The visible indicia, taggant, or fluorescent image 30 is then compared to the reference-standard sample-specimen 90 for authentication.

In preferred embodiments of the invention, for the lowest cost, the article-under-test 20 with its optional holder 140 and reference-standard sample-specimen 90 with its optional holder 115 are stationary in use. A slot 130 is provided for accommodating a movable reference-standard sample-specimen 90 and/or its optional holder 115. FIG. 2B shows a holder 115 for a reference-standard sample-specimen, with a salient portion 120 that fits slidably into slot 130.

In yet another embodiment, holders 115 and/or 140 are made interchangeable so that different articles and/or reference-standard sample-specimens can be used in the same basic authentication system 10. In the embodiment illustrated in FIGS. 2C and 2D, the article holder is a special receptor 140 specifically designed for the particular article-under-test 20. The reference-standard sample-specimen 90 is contained in a movable holder 115 (FIG. 2B) that can be positioned near or superimposed upon the article-under-test 20 for effective comparison. For a different article-under-test 20, a new holder 140 and a new reference-standard sample-specimen holder 115 are used in place of the previously mentioned holders.

The housing 60 including its base 40 is preferably made of lightweight material such as injection molded ABS plastic for portable applications and low cost in this preferred embodiment. In another embodiment, housing 60 is made of sturdier material, such as metal or a different plastic for stability in a desktop application.

Conventional AC power and/or DC power and suitable switches (150 and/or 160) are provided for powering the excitation source 65 in the authentication system 10.

The article-under-test 20 or the article holder 140 can actuate a momentary on/off switch 170 controlling the excitation source. Switch 170 is shown in FIG. 1. A conventional numeric counter (not shown) with/without reset is wired in series with the momentary switch so that it can register the number of articles that have been authenticated. Another conventional numeric counter (not shown) can be manually activated to register the number of counterfeit articles that have been discovered. Optionally, a conventional output device (not shown) may be connected to these switches to link the authentication apparatus to a remote or external conventional data acquisition system to record instances of genuine and counterfeit articles.

There are many possible embodiments for the taggants or for indicia 30 marking the article-under-test 20 for authentication. For example, a stripe with predetermined length, width, orientation, color characteristics, and intensity can be printed on a specific location of the article 20, as shown in FIG. 2B. Reference-standard sample-specimen 90 has corresponding fluorescent indicia 110. In a particular method ("missing link" method), an image 30 is printed with special UV- or IR-sensitive chemicals that completes an otherwise incomplete image that is discernible under visible light. Only the combination of the normally visible and the normally invisible parts is readily recognizable. This "missing link" method is described in U.S. Pat. Nos. 5,719,948 and 5,867,586, of which the entire disclosure of each is hereby incorporated by reference. Thus, it will be appreciated that the present invention facilitates visual verification of many kinds of authentication features: those features discernible in ordinary light in the visible spectrum, those visible only when illuminated by invisible light outside the visible spectrum, and combinations of both visible and invisible features.

In another (additional or alternative) method, a sample specimen 100 that is printed on a transparent film is used, and is superimposed over the article-under-test 20 to improve the accuracy of the authentication process. Furthermore, this apparatus can be used to authenticate visible indicia or combinations of both visible and invisible indicia. This apparatus can also be employed to determine if so-called "tamper-evident" seals have been compromised. In the latter application, a suitable un-tampered seal is depicted in the reference-standard sample-specimen. Many other methods can be employed with this authentication system to improve the reliability of detecting counterfeit or tampered-with articles.

For articles that are tagged with infrared-sensitive chemicals, the excitation source 65 is an IR lamp and the viewing window is replaced or augmented with an appropriate optical filter or filters so that the taggant or fluorescent image is visible. The viewing window may include one or more infrared (IR) bandpass filters, limiting the range of wavelengths of IR radiation.

Figure 3:
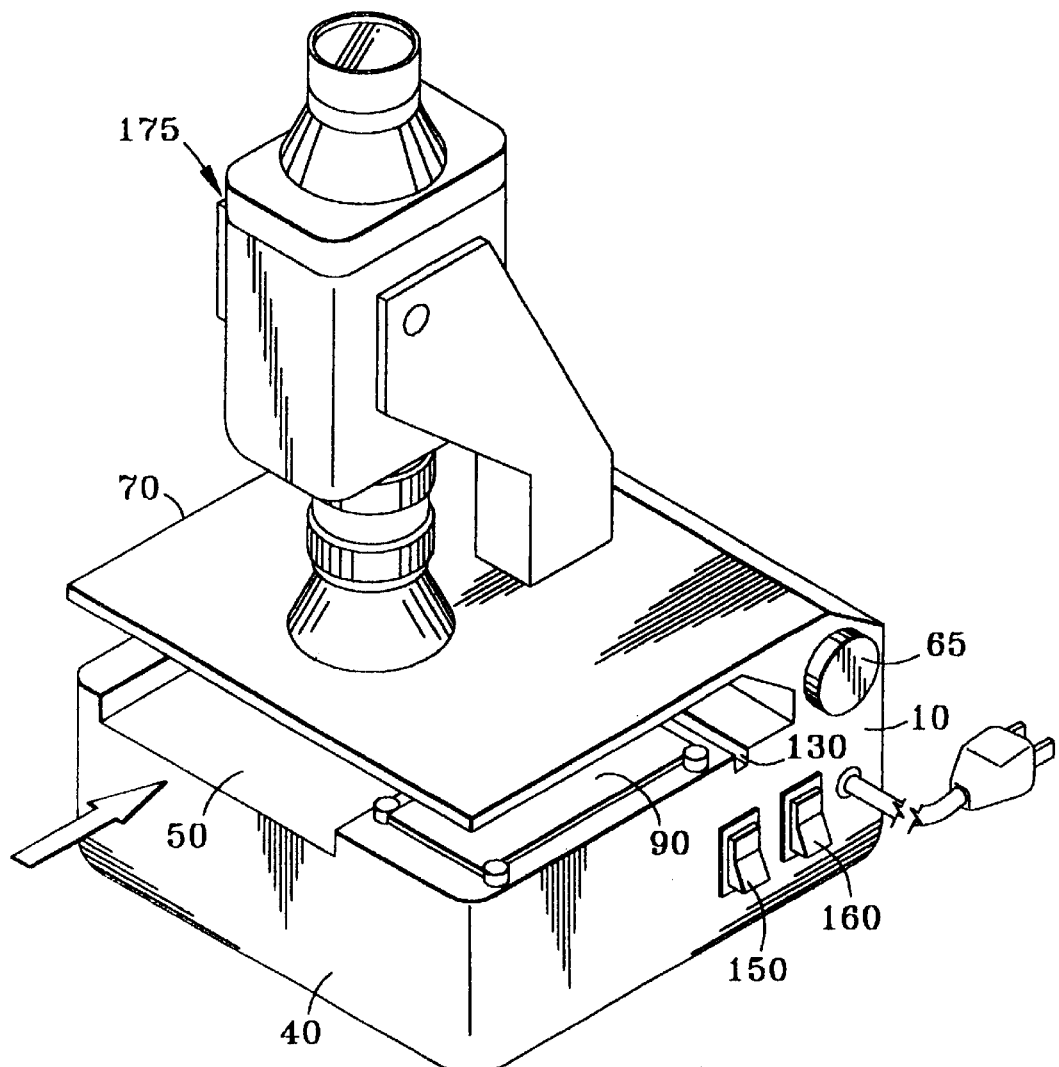
FIG. 3 shows a perspective view of a third embodiment of an authentication apparatus made in accordance with the invention.

FIG. 3 shows an embodiment having an infrared viewer 175, for use with taggants visible only when viewed in the infrared portion of the spectrum. Infrared viewer 175 may be a conventional infrared viewer or "IR scope," such as the models 31074, 37826, or 38173 available from Edmund Scientific Company, Inc. (Edmund Industrial Optics Division) of Barrington, New Jersey, or the models NZT-1 or NV-100 available from Orion Telescopes and Binoculars of Santa Cruz, Calif. A person of ordinary skill in this field will recognize that such conventional infrared viewers are conventionally designed for relatively long-distance viewing and that their use in the present invention may require adaptation with suitable infrared optics for focusing at short distances (e.g., an infrared-transparent close-up or "macro" lens, such as the model 38175 close-up attachment available from Edmund Scientific Company, Inc., Edmund Industrial Optics Division, of Barrington, N.J.). Equivalent reflective optics may be used in place of an infrared-transparent close-up or "macro" lens. Some conventional infrared viewers, such as the model NV-100 mentioned above, include a built-in infrared light source. Using such a viewer in the present invention allows substitution of the built-in IR source for the distinct source 65 shown in FIGS. 1 and 3. In the embodiment of FIG. 3, the top surface of the apparatus may be opaque to visible light as depicted in FIG. 3, but transparent to the invisible infrared light. A viewing window 80 as shown in FIGS. 1 and 2A should have suitable transmission characteristics for the wavelengths of visible and/or invisible light to be transmitted.

With either UV or IR excitation sources, the source 65 may be optionally modulated at a frequency (e.g. 5 Hz) and duty cycle (e.g. 50%) that is easily perceptible to the human user. If the excitation source is not modulated at such a frequency, it may remain continuously activated for ease of operation; or else, it may be activated only on demand to conserve energy. As mentioned above, "on-demand" activation of source 65 may be accomplished by a "momentary" on/off switch 170 actuated by insertion of an article-under-test 20 to be authenticated or by article holder 140.

Figure 4:
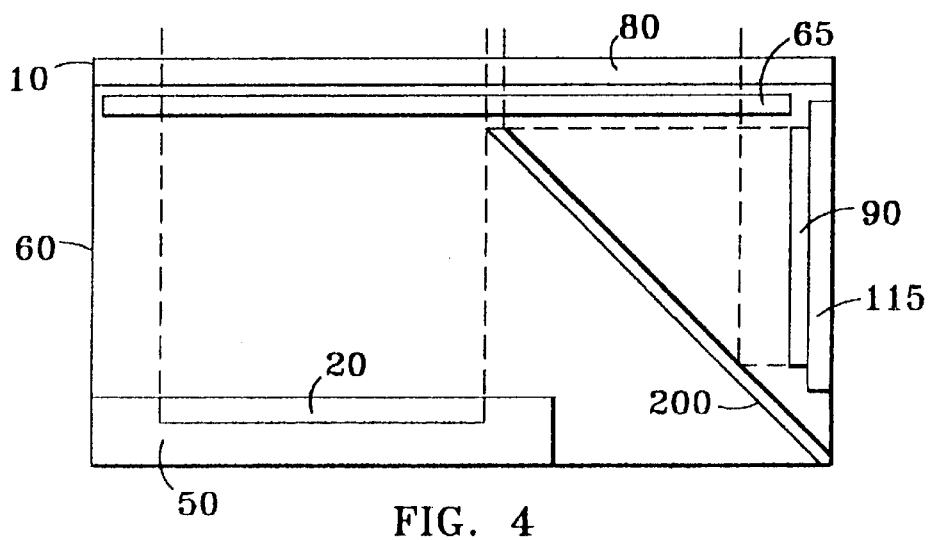
FIG. 4 shows a schematic diagram of a fourth embodiment of an authentication apparatus.

FIG. 4 shows schematically another embodiment of the invention, in which optical means 200, such as a mirror, half-silvered mirror, prism, or beam splitter, provides a "spilt-field" or "split-image" view through window 80. In this embodiment, the optics can be arranged optionally so that a user sees a single split image of an article, with one half of the image corresponding to the article-under-test 20 and the other half corresponding to the reference-standard sample-specimen 90. In a similar embodiment, the optics 200 are arranged to superpose an image of the reference-standard sample-specimen 90 over the article-under-test 20 or over its image. As in other embodiments, the reference-standard sample-specimen 90 is disposed on the reference-sample specimen holder. The image of the reference-standard sample-specimen is superposed in at least partial alignment with the article-under-test 20 or with its image. The schematic representation in FIG. 4 is intended to portray either split-image or superposed-image arrangements. Such embodiments allow precise alignment of the article-under-test 20 with the reference-standard sample-specimen 90 and more exact visual comparisons of the characteristics such as the position(s) and color(s) of indicia 110 with corresponding features represented on reference-standard sample-specimen 90.

Figure 6:
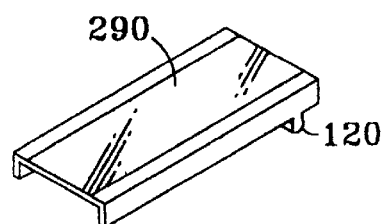
FIG. 6 shows a perspective view of an accessory used with an authentication apparatus.
Figure 7:
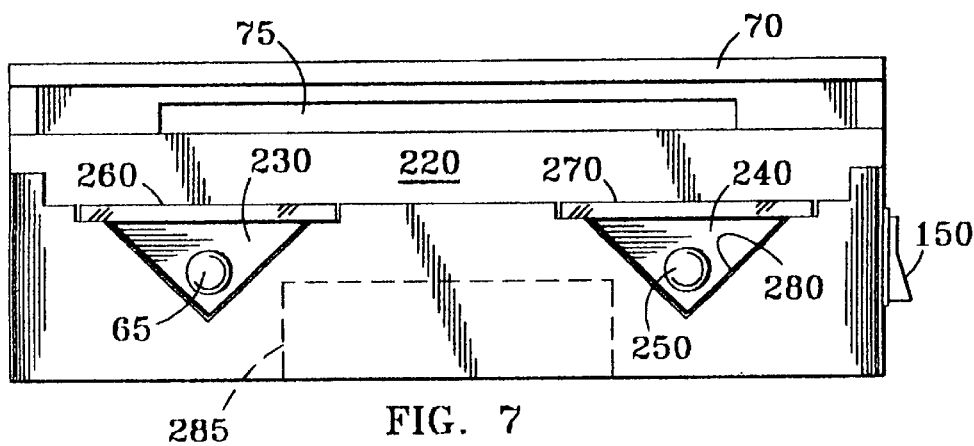
FIG. 7 shows a front elevation view of the apparatus of FIG. 5.

FIGS. 5 and 7 respectively show a perspective view and a front elevation view of a fifth embodiment 200 of the apparatus, having a housing base 210, the top surface 140 of which optionally supports a viewing window (shown partially cutaway in FIG. 5). Top surface 140 has a slot 215 for accommodating a movable part 290 (FIG. 6, described below). A receptor space 220 (Cf. FIG. 7) is provided for receiving article-under-test 20, which, if authentic, has authentication indicia 30. An arrow in FIG. 5 represents insertion of article-under-test 20 into receptor space 220. This embodiment has both a source 65 of non-visible radiation and a source 250 of bright visible light for comparison of watermarks etc. in article 20 with corresponding features depicted in a reference-standard sample-specimen 90. Visible source 250 is in a recess 240 (preferably with reflective inner walls 280) under the receptor space 220. Non-visible source 65 is in a recess 230, preferably with reflective inner walls, also disposed under receptor space 220. Optional optical elements 260 and 270 fit in relatively shallow recesses at the top of recesses 230 and 240 respectively to provide optical filters. Optical elements 260 and 270, if used, have transmission characteristics suitable for the non-visible or visible radiation of the respective sources 65 or 250. Alternatively (or in combination with optical filtering), optical elements 260 and/or 270 may incorporate a reference-standard sample-specimen 90. For clarity, optical elements 260 and 270 are omitted from FIG. 5, but shown in FIG. 7. FIG. 7 also shows an internal battery compartment 285 for containing a conventional battery power supply and suitable connections when the apparatus is used in its portable configuration.

As mentioned above, a reference sample specimen 100 may be printed on a transparent substrate and superimposed over the article-under-test 20. Such a transparent type of reference sample specimen 100 may be included in a viewing window, or alternatively may be carried on a movable part 290. In a variation of the embodiment of FIGS. 5 and 7, optical elements 260 and 270 may be replaced with individual reference-standard sample-specimens of the transparent type 100, suitable for different portions of article-under-test 20. In each case, the apparatus provides for disposing a reference-standard sample-specimen 90 or 100 for juxtaposition with the article-under-test 20 for comparison during authentication.

FIG. 6 shows a perspective view of a movable part 290 used with the apparatus embodiment of FIG. 5. Movable part 290 fits a slot in base 40 of housing 60 and is movable for examining various portions of article-under-test 20 disposed in receptor 220 of the apparatus for juxtaposition with a reference-standard sample-specimen 90. For some applications, movable part 290 itself carries reference-standard sample-specimen 90 for juxtaposition over article-under-test 20. Movable part 290 may include a magnifying glass, e.g., a Fresnel lens, and/or may include an optical filter.

Figure 8:
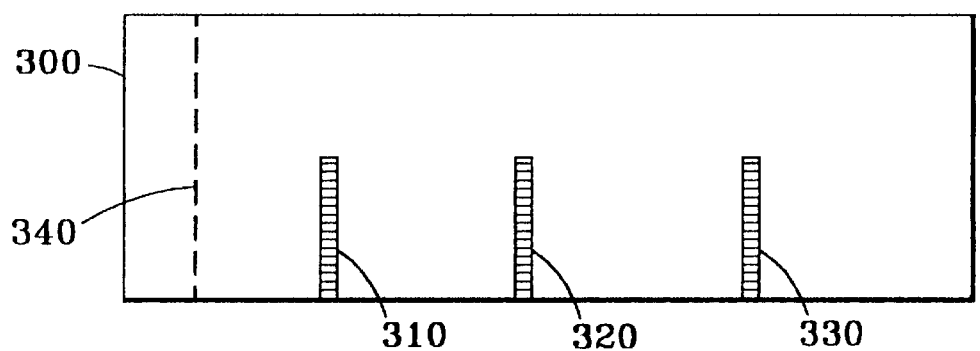
FIG. 8 shows a top plan view of a reference-standard sample-specimen suitable for a specific application.

FIG. 8 shows a top plan view of a reference-standard sample-specimen 300 suitable for a specific application. This reference-standard sample-specimen has a reference line 340 for precise positioning of an edge of a currency bill, and three visible lines 310 (green), 320 (red), and 330 (yellow). The colors of lines 310, 320, and 330 respectively match the colors of visible fluorescence from plastic "security threads" embedded in the paper of authentic United States currency bills of $20, $100, and $50 denominations excited by suitable ultraviolet radiation. The positions of these colored lines 310, 320, and 330 also respectively match the correct positions of the corresponding plastic security threads embedded in the paper of authentic United States currency bills of $20, $100, and $50 denominations. Thus, the reference-standard sample-specimen 90 shown in FIG. 8 includes visible examples of genuine authentication features of authentic United States currency bills. FIG. 8 is not drawn to the exact scale of U.S. currency bills, but an actual reference-standard sample-specimen 300 is made to the correct scale, to provide for precise juxtaposition with the currency article-under-test 20. If and when similar security features are incorporated into bills of other denominations, reference-standard sample-specimens 300 are made accordingly. Such reference-standard sample-specimens are made with colors and positions of the particular security features incorporated into those bills of other denominations, and are preferably added to the features shown in FIG. 8 so that a single reference-standard sample-specimen can cover all bill denominations. Similarly, reference-standard sample-specimens corresponding to the security features incorporated into currency of other countries provide for authentication of those currencies.

Figure 9:
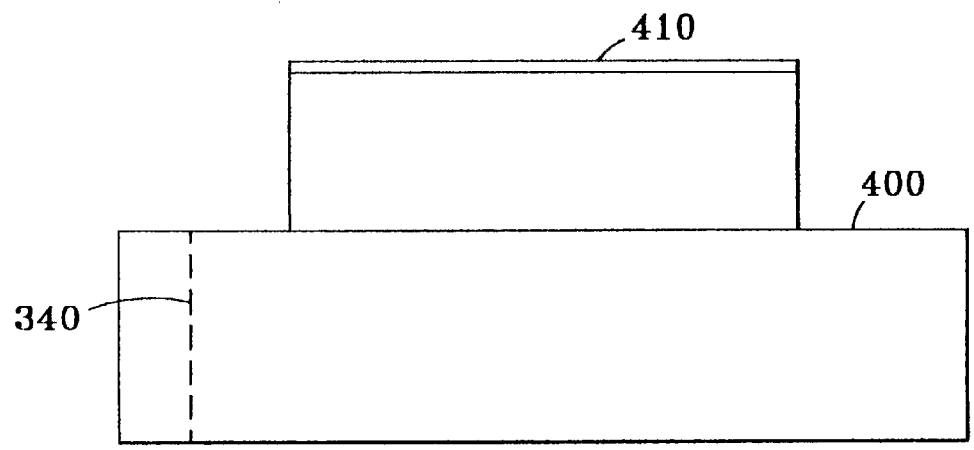
FIG. 9 shows a top plan view of an article holder platform.
Figure 10:
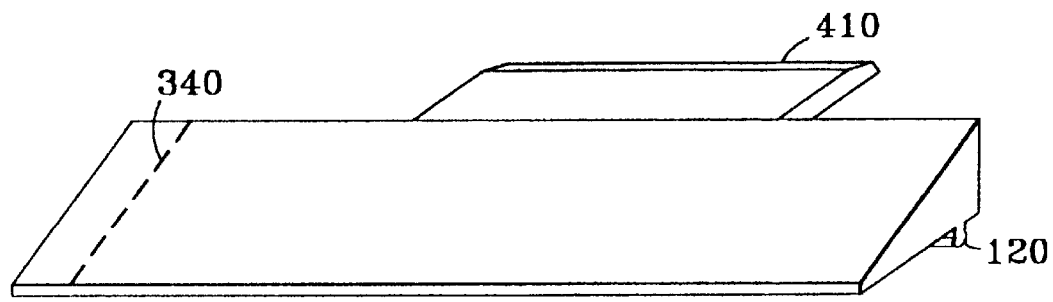
FIG. 10 shows a perspective view of an article holder platform.
Figure 11:
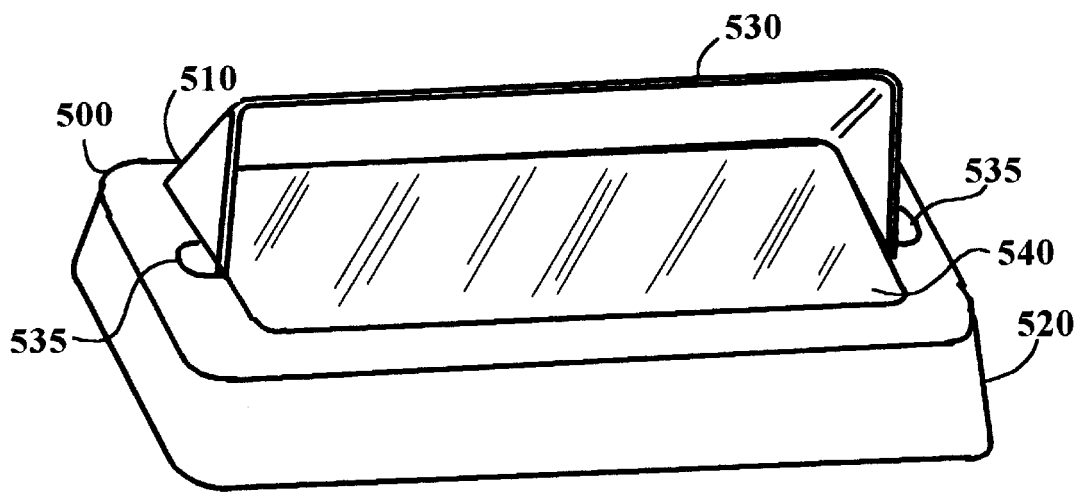
FIG. 11 shows a perspective view of a sixth embodiment of an authentication apparatus made in accordance with the invention.

FIGS. 9 and 10 respectively show a top plan view and a perspective view of an article holder platform 400 having a salient portion 410 that fits into a mating slot 75 in housing 60 of authentication apparatus 10. Article holder platform 400 has a reference line 340, corresponding to reference line 340 of the reference-standard sample-specimen 300 of FIG. 8. The reference line 340 of FIGS. 9 and 10 is preferably formed as a physical ridge or step in the surface, to facilitate alignment of an article-under-test 20 by positioning the edge of article 20 against the ridge or step. FIG. 11 shows a perspective view of a sixth embodiment 500 of an authentication apparatus made in accordance with the invention. As shown in FIG. 11, the housing 510 of this embodiment has a base portion 520 and a shroud 530. Base portion 520 corresponds to housing base 210 of FIG. 5 and shroud 530 corresponds to cover portion 70 of FIG. 5. Shroud 530 is disposed to shield the article-under-test from ambient light when the article is on a flat-surface receptor 540 provided in housing 510 as a receptor for receiving and supporting both a reference-standard sample-specimen and the article-under-test. Flat-surface receptor 540 is made of substantially transparent material such as glass or transparent plastic. Shroud 530 may have tabs 535 adapted for screws or other conventional fasteners (not shown) for fastening the shroud to base portion 520 of housing 510. Alternatively, tabs 535 may be molded in the form of conventional snap-in elements to act as fasteners when inserted into holes (not shown) provided in base portion 520. In use of the apparatus, a removable reference-standard sample-specimen is disposed for juxtaposition with the article-under-test for comparison during authentication. The removable reference-standard sample-specimen may be one like specimen 300 of FIG. 8 or FIG. 15.

Figure 12:
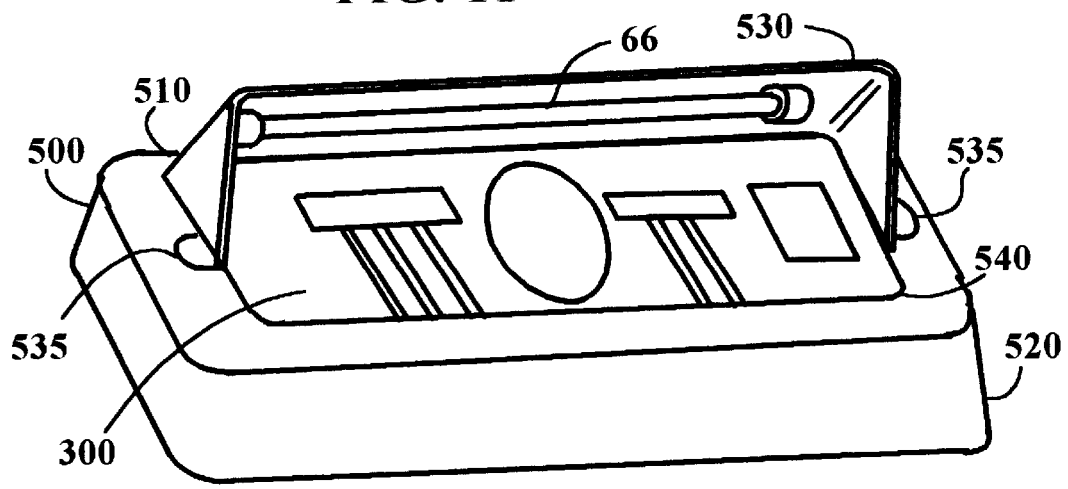
FIG. 12 shows a perspective view of the embodiment of FIG. 11 with a reference-standard sample-specimen made in accordance with the invention and an optional second excitation source.

FIG. 12 shows a perspective view of the embodiment of FIG. 11 with a reference-standard sample-specimen 300 in place. FIG. 12 also shows an optional additional non-visible excitation source 66 (e.g., an ultraviolet lamp) disposed under shroud 530. Excitation source 66 can illuminate fluorescent features such as those on some non-U.S. currencies that cannot be excited by ultraviolet light incident on the rear surface of the currency.

Figure 13:
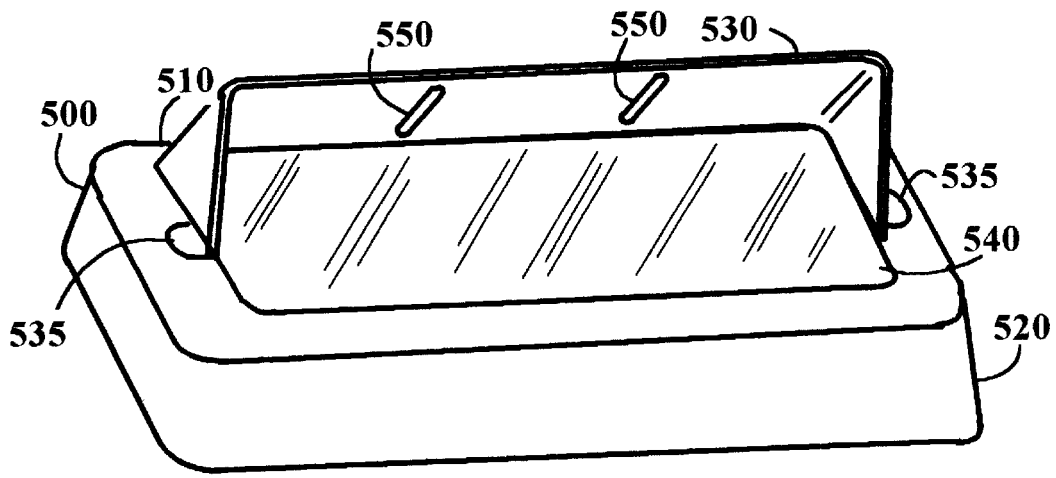
FIG. 13 shows a perspective view of an embodiment having optional features.

FIG. 13 shows a perspective view of an embodiment having optional slot features 550 in shroud 530. Slots 550 may be about 3 mm wide and 19 mm long, for example. If present, such slots 550 in the otherwise opaque shroud 530 are disposed to be in at least partial alignment with selected features of reference-standard sample-specimen 300, such as lines 310, 320 or 330 of FIG. 8. In that case, they are oriented as shown in FIG. 13 so that they would appear vertical when viewed from the front (open side) of shroud 530.

Figure 14:
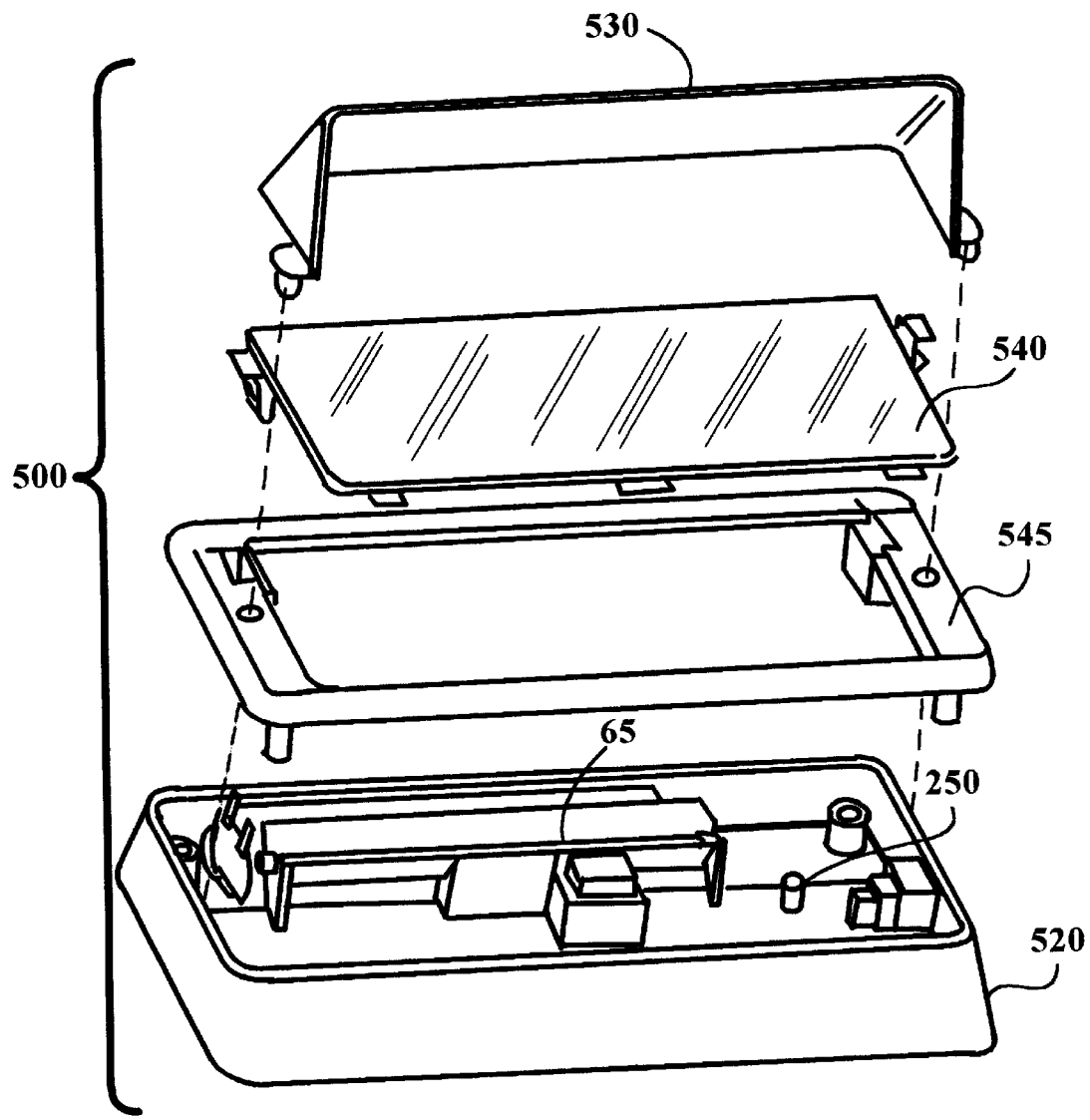
FIG. 14 shows an exploded perspective view of the embodiment of FIG. 11.

FIG. 14 shows an exploded perspective view of the embodiment 500 of FIG. 11, illustrating how it may be constructed and how housing 510 may be assembled from shroud 530, flat-surface receptor 540, a supporting frame 545 for flat-surface receptor 540, and base portion 520. In FIG. 11, the various parts are fastened together by conventional snap-in structures 560 and other conventional boss elements 565 for screws (not shown). Base portion 520 holds source 65 and source 250 and suitable conventional wiring etc. for energizing the sources.

Figure 15A:
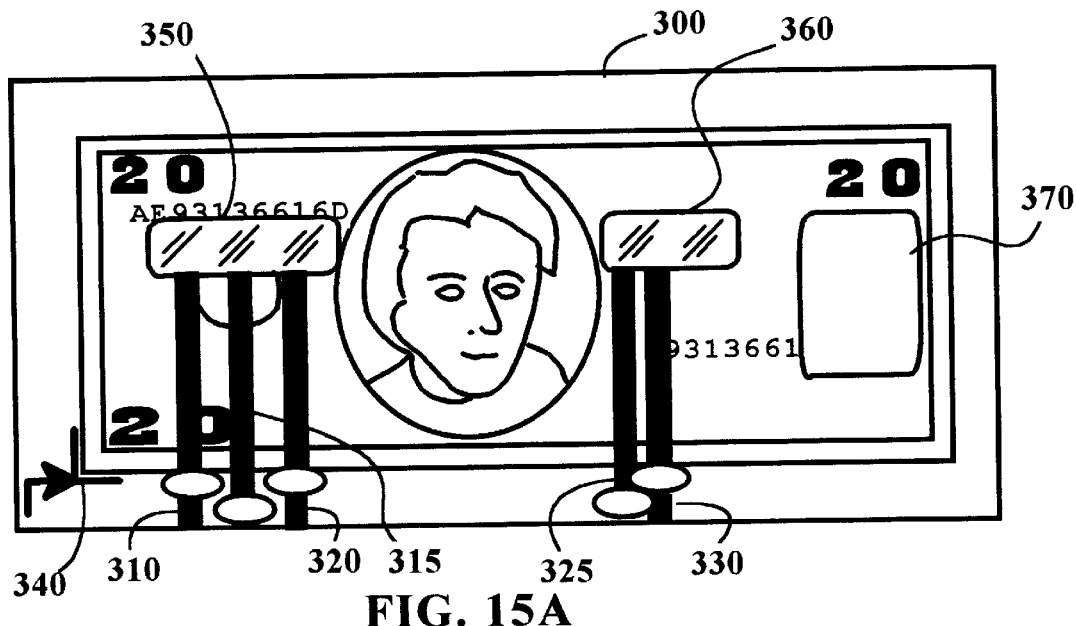
FIGS. 15A and 15B show top plan views of a reference-standard sample-specimen suitable for use in authentication of specific currency articles.
Figure 15B:
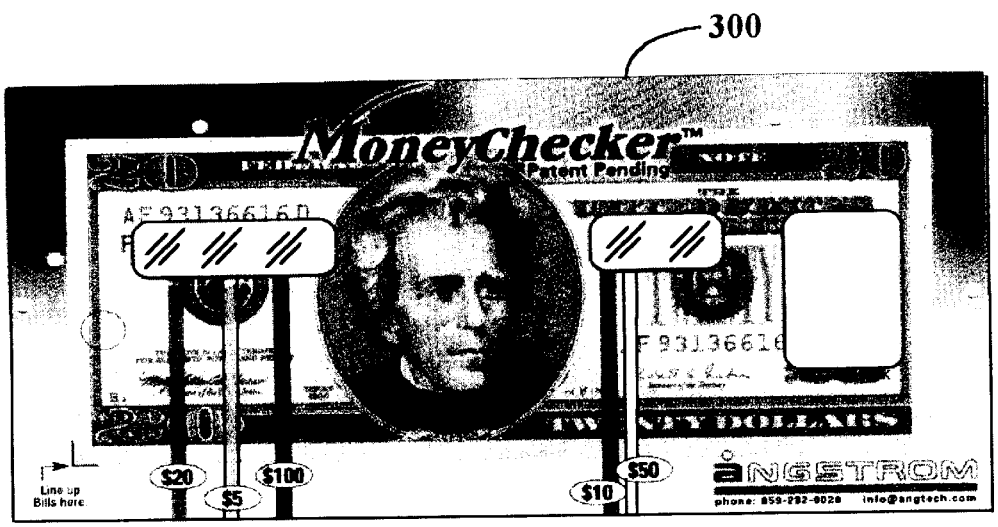

FIGS. 15A and 15B show top plan views of a reference-standard sample-specimen 300 suitable for use in authentication of specific U.S. currency articles, for example. It will be understood that suitable variations may be incorporated to make similar reference-standard sample-specimens for other currencies. The reference-standard sample-specimen 300 shown in FIG. 15A has colored indicia 310, 315, 320, 325, and 330. It also has transparent "window" portions 350 and 360, aligned with the specific features (in this case colored indicia 310, 315, 320, 325, and 330). The three visible-line indicia 310 (green), 320 (red), and 330 (yellow) are described above in connection with FIG. 8. Colored visible-line indicia 315 (blue) and 325 (orange) correspond to features of U.S. $5 and $10 currency denominations respectively. Reference indicia 340 are provided for precise positioning of an edge of an article-under-test, such as a currency bill. The transparent portions 350 and 360 allow ultraviolet light from source 65 to pass through reference-standard sample-specimen 300 to the article-under-test.

Source 65 as shown in FIG. 14 is a black-light lamp. The reference-standard sample-specimen 300 of FIGS. 15A and 15B also has a translucent "window" portion 370, which allows white light from source 250 to pass through reference-standard sample-specimen 300 to the article-under-test. Source 250 as shown in FIG. 14 is a white-light-emitting diode (LED). Translucent "window" portion 370 is disposed for at least partial alignment with locations of watermarks known to be in genuine articles. FIG. 15B is a black-and-white reproduction of an actual reference-standard sample-specimen for authentication of U.S. currency used at the time of the present specification.

Figure 16:
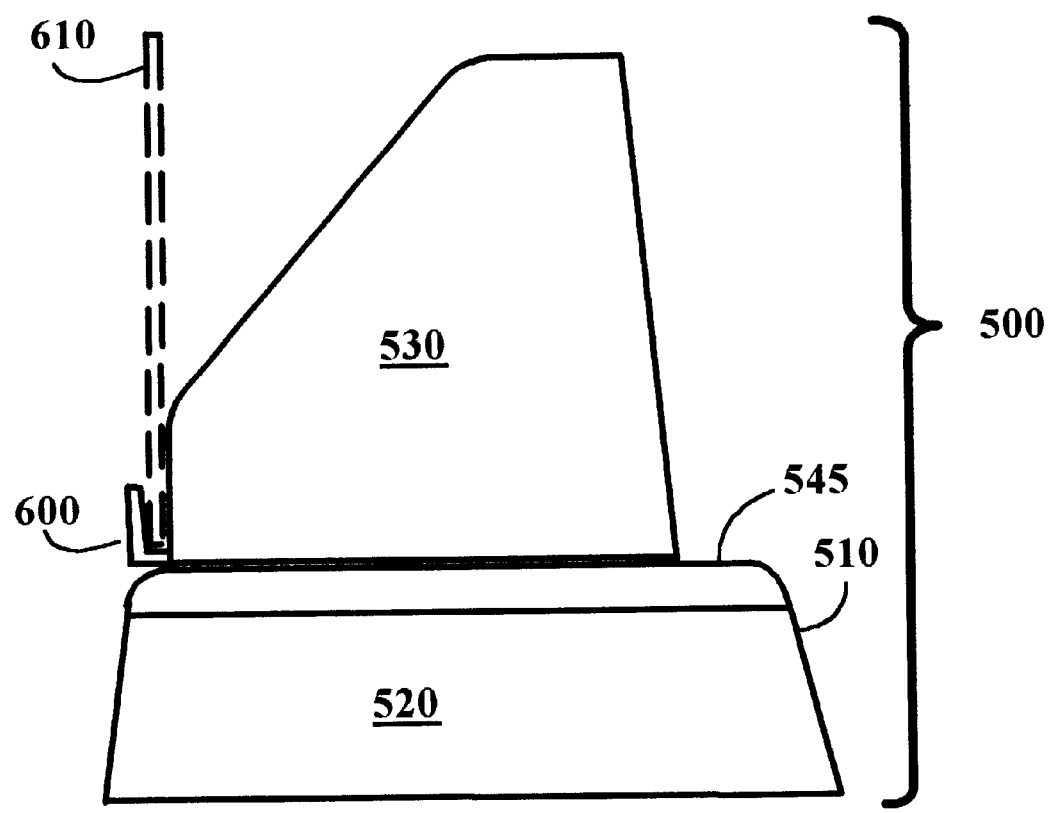
FIG. 16 shows a side elevation view of an embodiment like that of FIG. 11, illustrating optional clips disposed adjacent to the rear surface of a shroud for holding a card.

FIG. 16 shows a side elevation view of an embodiment like that of FIGS. 11 or 14, illustrating optional clips 600 disposed adjacent to the rear surface of a shroud for holding a card 610, which may carry indicia, e.g., for displaying advertising information or reference information. As shown in FIG. 16, clips 600 can hold card 610 in a substantially vertical configuration. Card 610 can be made large enough to substantially hide the apparatus from being viewed from behind the shroud. Such an arrangement may be desired for use of the apparatus in a bank or office, to prevent viewing of the authentication operation by customers.

Thus, one important aspect of the invention is an apparatus for authenticating an article, the apparatus including a housing, a receptor within the housing for receiving and supporting the article-under-test during authentication, and a removable reference-standard sample-specimen disposed for juxtaposition with the article-under-test for comparison with the article-under-test during authentication. A user can see both the article-under-test and the reference-standard sample-specimen simultaneously and juxtaposed for easy comparison, and can easily compare particular authentication features directly with respect to multiple characteristics such as size, position, orientation, contrast, and color (e.g., hue, color saturation, and brightness). In other important aspects of the invention, in which the article (if authentic) has been previously marked with indicia for authentication, the apparatus has a source of radiation disposed within its housing, and there is a receptor within the housing for receiving the article-under-test and supporting the article-under-test in a position such that the indicia are illuminated by the radiation during authentication. A particularly useful aspect of the invention exploits authentication indicia visible only under illumination with invisible radiation, and the source of radiation includes at least a source of invisible radiation, such as ultraviolet or infrared radiation. Optionally, the apparatus can have a switch, such as a pushbutton switch to activate an audible and/or visible alarm in case of detection of a counterfeit article, and optionally, such an alarm may be located remotely from the authentication apparatus.

Another important aspect of the invention is an authentication system for distinguishing a genuine article from a counterfeit article, the authentication system comprising a housing, (including a substantially opaque shroud disposed to shield the article-under-test from ambient light), at least one excitation source capable of emitting radiation in a predetermined portion of the electromagnetic spectrum, an article receptor disposed to hold an article-under-test for illumination by the excitation source, and a reference-sample specimen disposed in juxtaposition with the article receptor. The reference-sample specimen in this aspect of the invention has one or more first portions transparent to radiation in a first predetermined part of the electromagnetic spectrum for alignment with fluorescent features known to be present in genuine articles. The reference-sample specimen also has one or more second portions translucent to radiation in a second predetermined part of the electromagnetic spectrum for alignment with watermark features known to be present in genuine articles. The reference-sample specimen in this aspect of the invention also has colored indicia disposed for alignment with fluorescent features of genuine articles.

INDUSTRIAL APPLICABILITY

The invention may be used for first-order authentication of articles in many applications where the complexity and expense of automatic authentication is not easily justified or is logistically unsuitable or inconvenient to employ, such as in the authentication of theatre tickets, promotional premiums such as prize coupons, toys, and in mobile field applications or in a brightly-lighted environment. Yet another application example is the detection of articles or package seals that have been tampered with. The description of the embodiments of the present invention is given above for the understanding of the present invention. It will be understood that the invention is not limited to the particular embodiments described herein, but is capable of various modifications, rearrangements, and substitutions that will now become apparent to those skilled in the art, without departing from the scope of the invention. Functionally equivalent elements and materials may be substituted for those used in the embodiments as shown herein. For example, it will be recognized that there are many functionally equivalent means for presenting a split field or split image to the user, as is done in some conventional camera rangefinders or conventional optical comparators. The reference-standard sample-specimen may include or may consist of a printed description of features to be authenticated and/or the salient characteristics of those features, or it may include printed instructions describing how to determine authenticity of an article-under-test. In addition, the optical arrangement or excitation source switching can be varied to utilize the methods of conventional "blink comparators" wherein the feature of interest is made to blink on and off to ensure the user's attention.

Therefore it is intended that the following claims cover all such modifications and changes as fall within the true spirit and scope of the invention.

What is claimed is:

1. An apparatus for authentication of an article, comprising:
   a) a housing, said housing including a base portion and a shroud disposed to shield said article from ambient light,
   b) a receptor within said housing for receiving and supporting said article during authentication, and
   c) a removable reference-standard sample-specimen disposed for juxtaposition with said article for comparison during authentication.

2. An apparatus as in claim 1, wherein said shroud is substantially opaque.

3. An apparatus as in claim 1, further comprising a source of non-visible radiation disposed under said shroud.

4. An apparatus as in claim 3, wherein said source of non-visible radiation disposed under said shroud is an ultraviolet source.

5. An apparatus for authentication of an article, said apparatus comprising:
   a) a housing, said housing including a base portion and a shroud disposed to shield said article from ambient light, b) a receptor within said housing for receiving and supporting said article during authentication, c) a source of non-visible radiation disposed under said shroud, and d) a removable reference-standard sample-specimen disposed for juxtaposition with said article for comparison during authentication, said reference-standard sample-specimen including one or more portions transparent to radiation in a predetermined part of the electromagnetic spectrum.

6. An apparatus as in claim 5, wherein said source of non-visible radiation disposed under said shroud is an infrared source.

7. An apparatus as in claim 5, wherein said shroud has one or more slots disposed in at least partial alignment with selected features of said reference-standard sample-specimen.

8. An apparatus as in claim 5, wherein said transparent portions of said reference-standard sample-specimen are disposed for at least partial alignment with locations of fluorescent features known to be present in genuine articles.

9. An apparatus as in claim 5, wherein reference-standard sample-specimen further comprises colored indicia disposed in at least partial alignment with said transparent portions of said reference-standard sample-specimen.

10. An apparatus as in claim 9, wherein colored indicia are colored to match fluorescent colors of fluorescent features known to be present in genuine articles.

11. An apparatus as in claim 5, wherein said predetermined part of the electromagnetic spectrum includes non-visible radiation, and said apparatus further comprises a source of said non-visible radiation disposed within said housing in at least partial alignment with said transparent portions of said reference-standard sample-specimen.

12. An apparatus as in claim 11, wherein said non-visible radiation is ultraviolet radiation.

13. An apparatus as in claim 11, wherein said non-visible radiation is infrared radiation.

14. An apparatus as in claim 5, wherein said reference-standard sample-specimen includes one or more portions translucent to radiation in a predetermined part of the electromagnetic spectrum.

15. An apparatus as in claim 14, wherein said predetermined part of the electromagnetic spectrum includes visible radiation, and said apparatus further comprises a source of said visible radiation disposed within said housing in at least partial alignment with said translucent portions of said reference-standard sample-specimen.

16. An apparatus as in claim 14, wherein said predetermined part of the electromagnetic spectrum includes white light, and said apparatus further comprises a source of said white light disposed within said housing in at least partial alignment with said translucent portions of said reference-standard sample-specimen.

17. An apparatus as in claim 14, wherein said translucent portions of said reference-standard sample-specimen are disposed for at least partial alignment with locations of watermarks known to be in genuine articles.

18. An apparatus as in claim 5, wherein said source of non-visible radiation disposed under said shroud is an ultraviolet source.

19. An authentication system for distinguishing a genuine article from a counterfeit article, said authentication system comprising a housing, said housing including a substantially opaque shroud disposed to shield said article from ambient light, at least one excitation source capable of emitting radiation in a predetermined portion of the electromagnetic spectrum, an article receptor disposed to hold an article for illumination by said at least one excitation source, and a reference-sample specimen disposed in juxtaposition with said article receptor, said reference-sample specimen having one or more first portions transparent to radiation in a first predetermined part of the electromagnetic spectrum for alignment with fluorescent features known to be present in said genuine article, having one or more second portions translucent to radiation in a second predetermined part of the electromagnetic spectrum for alignment with watermark features known to be present in said genuine article, and having colored indicia disposed for alignment with said fluorescent features of said genuine article.

20. An apparatus as in claim 19, further comprising one or more clips disposed behind said substantially opaque shroud to hold a card.

21. An apparatus as in claim 20, wherein said one or more clips are arranged suitably for holding said card in a substantially vertical configuration.

22. An apparatus as in claim 20, further comprising a card carrying indicia.

23. An apparatus as in claim 20, further comprising a card of sufficient size to substantially hide said apparatus from being viewed from behind said shroud.

* * * * *